(12) United States Patent
Stillig

(10) Patent No.: US 11,193,285 B2
(45) Date of Patent: Dec. 7, 2021

(54) RAISED FLOOR ELEMENT FOR A RAISED FLOOR

(71) Applicant: Robert Bosch GmbH, Stuttgart (DE)

(72) Inventor: Javier Stillig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/697,644

(22) Filed: Nov. 27, 2019

(65) Prior Publication Data

US 2020/0173177 A1 Jun. 4, 2020

(30) Foreign Application Priority Data

Nov. 29, 2018 (DE) .................... 10 2018 220 561.2

(51) Int. Cl.
*E04F 15/02* (2006.01)
*E04F 15/024* (2006.01)
*H02J 50/10* (2016.01)

(52) U.S. Cl.
CPC .... *E04F 15/02405* (2013.01); *E04F 15/0247* (2013.01); *H02J 50/10* (2016.02)

(58) Field of Classification Search
CPC ............ E04F 15/02405; E04F 15/0247; E04F 15/02452; E04F 15/024; H02J 50/005
See application file for complete search history.

(56) References Cited

U.S. PATENT DOCUMENTS

| | | | | |
|---|---|---|---|---|
| 4,353,411 A * | 10/1982 | Harter | ...................... | F24F 7/04 165/129 |
| 9,271,334 B2 * | 2/2016 | Fu | .......................... | F24D 13/024 |
| 9,908,244 B2 * | 3/2018 | Burmeister | ............ | G08B 21/02 |
| 10,477,355 B1 * | 11/2019 | Niranjayan | ........ | E04F 15/02405 |
| 2009/0126308 A1 * | 5/2009 | Hannig | ..................... | B27F 1/04 52/588.1 |
| 2015/0361675 A1 * | 12/2015 | Cerny | ............... | E04F 15/02452 52/509 |
| 2016/0348831 A1 * | 12/2016 | Dombrowski | .... | E04F 15/02464 |
| 2018/0313096 A1 * | 11/2018 | Voelpel | ................. | F21V 33/006 |

FOREIGN PATENT DOCUMENTS

DE 20 2007 017 236 U1 5/2009

* cited by examiner

*Primary Examiner* — Patrick J Maestri
(74) *Attorney, Agent, or Firm* — Maginot, Moore & Beck LLP

(57) ABSTRACT

A raised floor element for a raised floor includes an upper floor panel with a limited free space configured to adjoin the upper floor panel to a bottom, at least two functional elements, and at least one connecting element configured to connect to at least one further raised floor element. At least one of the functional elements is configured to be actuated by a control device.

15 Claims, 6 Drawing Sheets

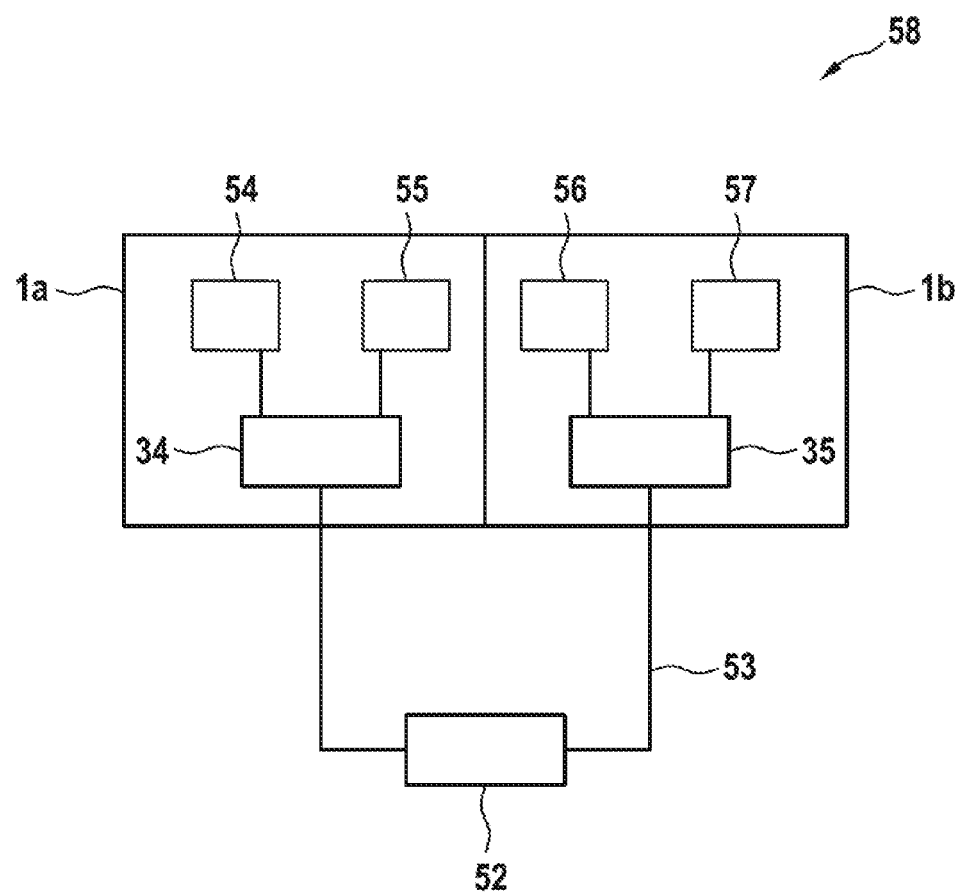

RAISED FLOOR ELEMENT FOR A RAISED FLOOR

This application claims priority under 35 U.S.C. § 119 to patent application no. DE 10 2018 220 561.2, filed on Nov. 29, 2018 in Germany, the disclosure of which is incorporated herein by reference in its entirety.

BACKGROUND

The disclosure relates to a raised floor element for a raised floor. The raised floor element is equipped with integrated additional functions, in particular. Furthermore, the disclosure comprises an arrangement of a plurality of raised floor elements.

Floor constructions referred to as "raised floors" are generally used in industrial buildings, in particular. In the case of a raised floor, panels which are placed on supports are arranged above an existing floor or above a solid raw ceiling which can be made from concrete, for example. By way of example, reference is made to DE 20 2007 017236 U1 for further explanation of the general structure of such a raised floor. The supports predominantly have a base plate placed on the lower floor or the raw ceiling. The raised floor panels can be removed. It is easily possible to equip and retrofit the buildings with lines for communication technology and electrical power as necessary with the aid of the raised floors because the lines can be laid in the intermediate space between the floor panels and the building floor. The lines are routed out of the intermediate space through cable bushings arranged on the floor panels.

Modern industrial production systems must be versatile. This means that, in order to produce products in an economical manner and in line with the market, the production systems must often be changed in terms of their configuration with respect to one another, but also in their spatial position. This problem occurs not only in a production environment which has already been used for years ("brownfield") but also even in new installations ("greenfield"). This results in the entire infrastructure which supplies the production system having to be adapted to the new configuration. Nowadays, the existing supply devices are typically dismantled to a particular point, the production installation is moved and a new media supply is then set up. The problem of dismantling and reconstruction is disadvantageous, in particular, for production systems of a defined size (power, weight, dimensions) and function.

On the basis of this, the object of the present disclosure is to provide a raised floor element which alleviates or even avoids the above-mentioned disadvantages. In particular, the intention is to enable a compact design and flexible conversion of the production devices in a structurally simple manner. In addition, the outlay, namely in terms of time and work, for reorganizing production is intended to be significantly minimized.

SUMMARY

These objects are achieved with a raised floor element and with an arrangement of a plurality of raised floor elements according to the disclosure. Further configurations of the disclosure are specified in the dependent patent claims. It should be pointed out that the description, in particular in connection with the figures, states further details and developments of the disclosure which can be combined with the features from the patent claims.

A raised floor element for a raised floor contributes to this, said raised floor element at least comprising an upper floor panel, a limited free space adjoining it to the bottom, at least two functional elements, at least one functional element of which can be actuated by a control device, and at least one connecting element for connection to at least one further raised floor element.

The raised floor element with integrated additional functions which is presented here, in particular for use in industrial environments, has the advantage that further additional functions are integrated in addition to the actual function (providing a space below the raised floor which is accessible at any point). It is advantageous, in particular, that, in a structurally sophisticated manner, the raised floor element does not need to be relocated if production is converted, but rather can remain at its location and only the functions of the functional elements in or on the raised floor element need to be changed. This makes it possible to flexibly convert the production devices.

Another particular advantage is that the outlay in terms of time and work for reorganizing production is significantly minimized.

The upper floor panel may form a flat termination of the raised floor element and is, in particular, suitable and configured to serve as a walkway for persons, a route for vehicles and/or a set-up area for machines. The floor panel may be at least partially transparent. The floor panel forms, in particular, a (completely) closed surface which extends (virtually or completely) over the maximum dimensions of the raised floor element. This floor panel is arranged furthest away from the floor or the raw ceiling in the mounted or installed position and is therefore referred to as the "upper" floor panel. It is possible for the raised floor element to have only a single floor panel.

The raised floor element is also configured in such a manner that it has a limited free space (extending in the direction of the floor or raw floor in the mounted position) from the upper floor panel. The free space is limited, in particular, by components which are assigned to the raised floor element. The free space may be limited by means of webs, supports, frames or frame fragments, etc. The free space may be, in particular, the space which has a (possibly adjustable) spatial depth and the areal dimensions of the upper floor panel. The free space is limited, in particular, in such a manner that it does not project (or only insignificantly projects) beyond the areal dimensions of the upper floor panel. It is desirable, in particular, for this free space to not be completely enclosed by the components mentioned, but rather for the components defining the free space to enable access from the side or from all sides.

A functional element may belong, in particular, to a pneumatic, hydraulic, electrical and/or electronic system. In particular, the functional element can make it possible to convey air, gas, oil, water, electricity, etc. (in a targeted manner). The functional element may be in several parts. The functional element may comprise at least one connection, a line section, a switch, a valve, an (electrical) load or the like.

At least one of the functional elements provided can be actuated by a control device of the raised floor element. If appropriate, a plurality or even all of the functional elements of the raised floor element can be actuated by this control device. Actuation of the functional element comprises the fact that its functions can be adjusted or activated and deactivated. For this purpose, a functional element may have an actuator, a switch, a valve or another actuating element which can be adjusted using signals from the control device.

The control device is provided and configured, in particular, to actuate (only) the at least one functional element of the raised floor element. This control device is therefore, in particular, a control system which is integrated in the raised floor element and influences or can influence (only) the functions of the associated raised floor element.

Furthermore, the raised floor element has at least one connecting element for connection to at least one further raised floor element. Connecting elements are preferably provided in such a manner that the raised floor element can be suitably attached to a further raised floor element at least on two opposite sides, preferably on all four sides. The connecting element can be permanently or releasably fitted to the raised floor element. The raised floor element can therefore be in the form of a raised floor element module which can form, in particular, a (closed) raised floor and/or an overall pneumatic, hydraulic, electrical and/or electronic raised floor system. The at least one connecting element can form, for example, form-fitting and/or force-fitting connections to (directly) adjacent raised floor elements (of an identical structure).

The control device is configured, for example, to activate and deactivate the functional element. In this case, intermediate functions, for example different brightnesses or colors, can also be adjusted. At least one functional element can preferably be switched on and off by the control device. The control device is preferably arranged on the floor panel or is integrated in the latter. If arranged on the floor panel, simple assembly and disassembly are possible.

The functional element may comprise, in particular, a device for contactless data and/or energy transmission. This device can communicate and/or interact, in particular, with an object or a device above the floor panel, that is to say can provide the device with data and/or energy and/or can receive data and/or energy through the (closed) floor panel or else can communicate with one or more persons by emitting/receiving information.

The functional element is preferably at least one selected from the following group:
 bidirectionally operating energy supply device,
 bidirectionally operating data transmission unit,
 visualization system comprising visualization actuators and a visualization unit.

A bidirectionally operating energy supply device comprises the fact that the supply of electrical energy to a device on the raised floor element functions in a wireless manner and consists of a coil system (primary and secondary coils) and a feed-in and feedback unit which is controlled by the control unit. In addition, the energy supply can also optionally be provided in a wired manner. The energy supply may have an energy measurement.

A bidirectionally operating data transmission unit includes the fact that a communication interface is integrated in the raised floor element, which communication interface allows the device on the raised floor element to be wirelessly connected to an industrial field bus or to a communication network, for example Ethernet, via the floor element. For this purpose, the data transmission unit is suitably connected to the coil system of the energy supply device or has an independently operating transmission device.

A visualization system is expediently integrated in the raised floor element and can comprise visualization actuators (for example individual LEDs or a screen) and a visualization unit. In this case, the visualization unit is likewise suitably connected to the industrial field bus or to the communication network.

Furthermore, mobile logistics systems, for example driverless transport systems, require a sufficient energy reserve for their journeys and must know their route via an on-board map system or lane markings. In this case, lane markings in the industrial environment, in particular, are usually static and can be changed only with an increased amount of effort. With regard to a change of lane markings, it is an advantage that the energy is supplied via the contactlessly operating energy supply system and relatively small batteries or no batteries are therefore needed to supply energy to the driverless transport system. The problem of route planning can be achieved by means of position detection via a sensor system. Track-based driverless transport systems can very easily follow the changed production sequence using a newly displayed route system. Machine operators see the current machine status on the floor, for example using a simple color system.

Another advantage is the easy display of information and its change. LEDs and monitors can be integrated in a raised floor element for this purpose. The visualization function, in combination with the sensor system, enables interactive man-machine communication.

Another important field of application is the display and monitoring of safe walkways in continuously changing production. So that intra-logistics and production systems are operated in an optimum and safe manner without the need for safety fences, barriers or enclosures, it is necessary to reliably detect and identify the position of persons within the production sequence via the sensor system.

The functional element is advantageously at least one selected from the following group:
 sensor, for example capacitively operating momentary-contact switch or acceleration sensor,
 actuator, for example switch for guiding track-bound industrial trucks, or lifting unit.

In a preferred sensor system, sensors of different types, for example capacitively operating momentary-contact switches for reliably detecting persons on the floor panel or acceleration sensors for detecting vibrations of the device on the floor panel, are integrated in the raised floor element. In this case, the sensor system consists of the sensor(s) and a suitable sensor evaluation unit. The latter is suitably connected to the industrial field bus or to the communication network.

In an advantageous actuator system, one or more actuators, for example mechanical switches for guiding track-bound industrial trucks and/or lifting units for lifting boxes, are integrated in the raised floor element. The actuator system may consist of the actuator element(s) and a suitable actuator unit, which are connected via the industrial field bus, with the result that the actuator system is supplied with the commands from a superordinate controller.

The raised floor element expediently comprises an outlet system for non-electrical media. In the case of such an outlet system for non-electrical media, suitable outlets for different non-electrical supply media, for example industrial compressed air or water supply, are integrated in the raised floor element. In this case, these outlets are equipped with suitable sensors, with the result that current consumption values can be transmitted to a superordinate controller via a field bus or communication network.

The functional element is preferably arranged in or on the floor panel. A compact design is enabled in the case of an arrangement in the floor panel. In addition, the functional element is at least partially protected from mechanical stress as a result and/or can capture measurement data more accurately on the surface of the floor panel. The functional element can at least partially extend into the free space. In particular, the functional element does not project beyond the limited free space. Retaining means which are used to retain the functional element permanently and in the exact position in relation to the floor panel can be provided.

The functional element is preferably an integral part of the floor panel. A particularly compact design is achieved as a result. It is possible, for example, for a functional element or a part of the latter to be molded into the floor panel or to extend (virtually) to the upper surface of the floor panel. This may be provided, for example, in the arrangement of sensors or LEDs so that, although this functional element is protected, it is visible from the outside, and the environment can be captured using sensors.

The free space is advantageously limited in a variably adjustable manner with at least one frame element. The floor panel is spaced apart from a raw floor by the frame element. The adjustability of the frame element enables a variable distance.

It is expedient that at least one connecting element is fitted to the floor panel. This makes it possible to securely fasten the raised floor element to further raised floor elements, thus forming a raised floor.

A plurality of connecting elements are advantageously provided and form at least one active coupling element and one passive coupling element. The coupling elements are suitable and configured to establish an appropriate, sealed, conductive, etc. connection to one another. In this case, the terms "active" and "passive" should be understood as meaning, for example, the fact that one (active) coupling element is configured in such a manner that it can be at least partially accommodated by the other (passive) coupling element. Examples of such paired coupling elements are connector-socket, hook-loop, screw-nut, click closure, bayonet closure, etc. In the raised floor element in particular, the two associated coupling elements are arranged at different locations, for example on opposite sides. In particular, these connecting or coupling elements serve to be coupled to those of an adjacent raised floor element.

The raised floor element expediently comprises at least one receptacle for an additional functional element. The receptacle may be in the form of a configured but free slot, connection, etc. The raised floor element is therefore prepared to be fitted with at least one additional functional element in an optional manner and as necessary in addition to the functional elements provided. The receptacle may be configured, in particular, in such a manner that, when the additional functional element is inserted, actuation by means of the control device is also (immediately) possible. Consequently, all lines, control connections, housings, etc. required for this purpose may already have been provided. The flexibility of the use of a raised floor element is therefore improved.

The raised floor element presented here is provided with its own controller and sensors and/or actuators in order to create an easily reconfigurable factory building floor, for example. The controller of each raised floor element can preferably be connected to a superordinate monitoring unit in a data-interchanging manner.

Another aspect proposes an arrangement of a plurality of raised floor elements, at least having a superordinate monitoring unit which is connected in a data-carrying manner to the control devices of the raised floor elements. The monitoring unit can prompt or ensure actuation of the functional elements of a plurality of raised floor elements in a manner matched to one another by instructing the control devices. A particular advantage is that it is possible to actuate the functional elements of different raised floor elements in a simple and reliable manner.

BRIEF DESCRIPTION OF THE DRAWINGS

The disclosure and the technical environment are explained in more detail below on the basis of figures. In this case, identical components are denoted using identical reference signs. The illustrations are schematic and are not provided for the purpose of illustrating proportions. The explanations given with reference to individual details of a figure can be extracted and can be freely combined with substantive matter from other figures or from the description above, unless something else necessarily emerges for a person skilled in the art or such a combination is explicitly prohibited here. In the drawings:

FIG. 6: schematically shows a block diagram for controlling two raised floor elements, wherein a superordinate monitoring unit is connected to the control devices of the raised floor elements.

DETAILED DESCRIPTION

Figure 1:
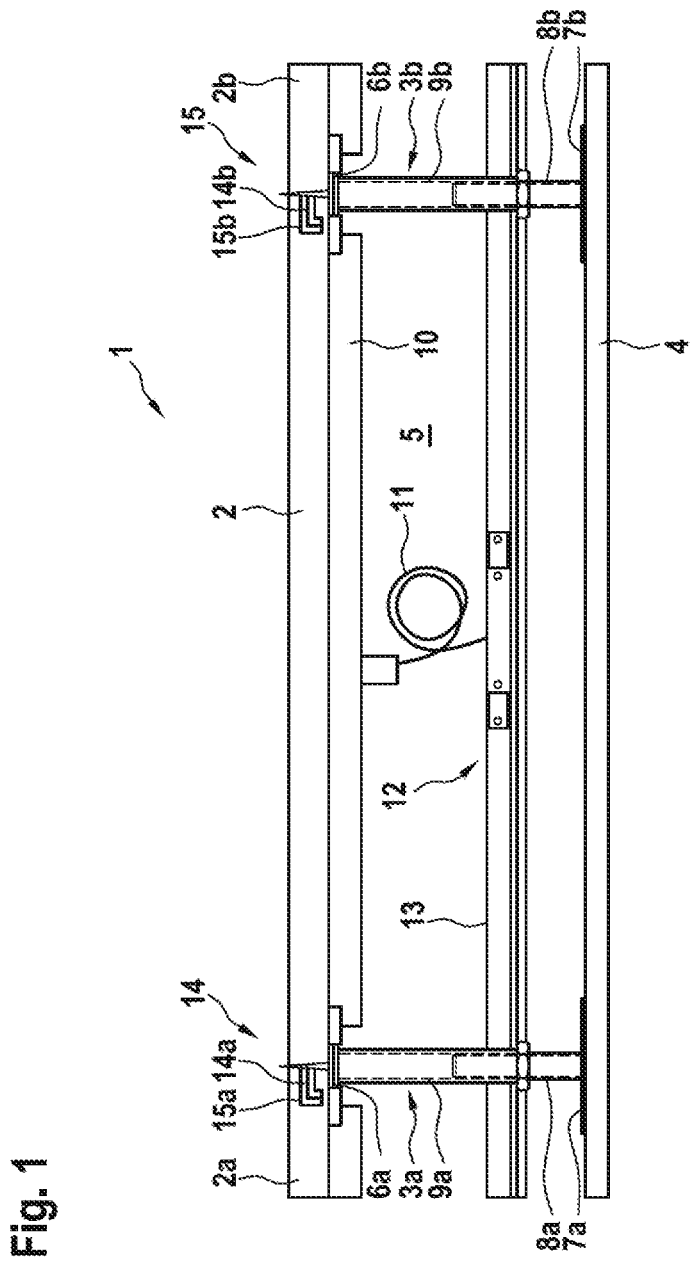
FIG. 1: schematically shows a side view of a raised floor element for integrated additional functions and—partially illustrated—two further connected raised floor elements.

According to FIG. 1, a raised floor element 1 consists of an upper floor panel 2 which rests, at the corners, on a frame element 3 in the form of supports 3a, 3b, for example metal supports, which support the floor panel 2 above a raw floor 4, for example made of concrete. The floor panel 2 is arranged at a distance from the raw floor 4 with the aid of the supports 3a, 3b, with the result that a free space 5 (intermediate space) is formed between the raw floor 4 and the floor panel 2, in a manner limited by the frame element 3. The supports 3a and 3b have a head plate 6a and 6b for supporting the corners of the floor panel 2 and a base plate 7a and 7b, by way of which the supports 3a and 3b rest on the raw floor 4. The height of the supports 3a, 3b is preferably adjustable, for example by means of a threaded shaft 8a and 8b on the base plates 7a and 7b which engages in a threaded tube 9a and 9b on the head plate 6a and 6b.

The raised floor element 1 corresponding to FIG. 1 with the "energy supply" function comprises a control and communication unit (see FIGS. 4 and 5) installed in the floor panel 2 and an energy supply device 10 which is connected, via a plug connection line 11, to an electrical supply network 12 in the free space 5.

The "energy supply device" 10 function is set up in the raised floor element 1 which absorbs the load above and has its own control and communication unit. The energy supply device 10 is contactless, that is to say electrical energy is transmitted to the device above, for example a production device or a logistics system, by means a suitable control unit and a coil arrangement. The energy supply device 10 is in turn connected, via the plug-in connection line 11, to the electrical supply network 12 for energy and data, which is implemented via a busbar 13, for example. The supports 3a, 3b mount the raised floor element 3 with respect to the raw floor 4.

Figure 2:
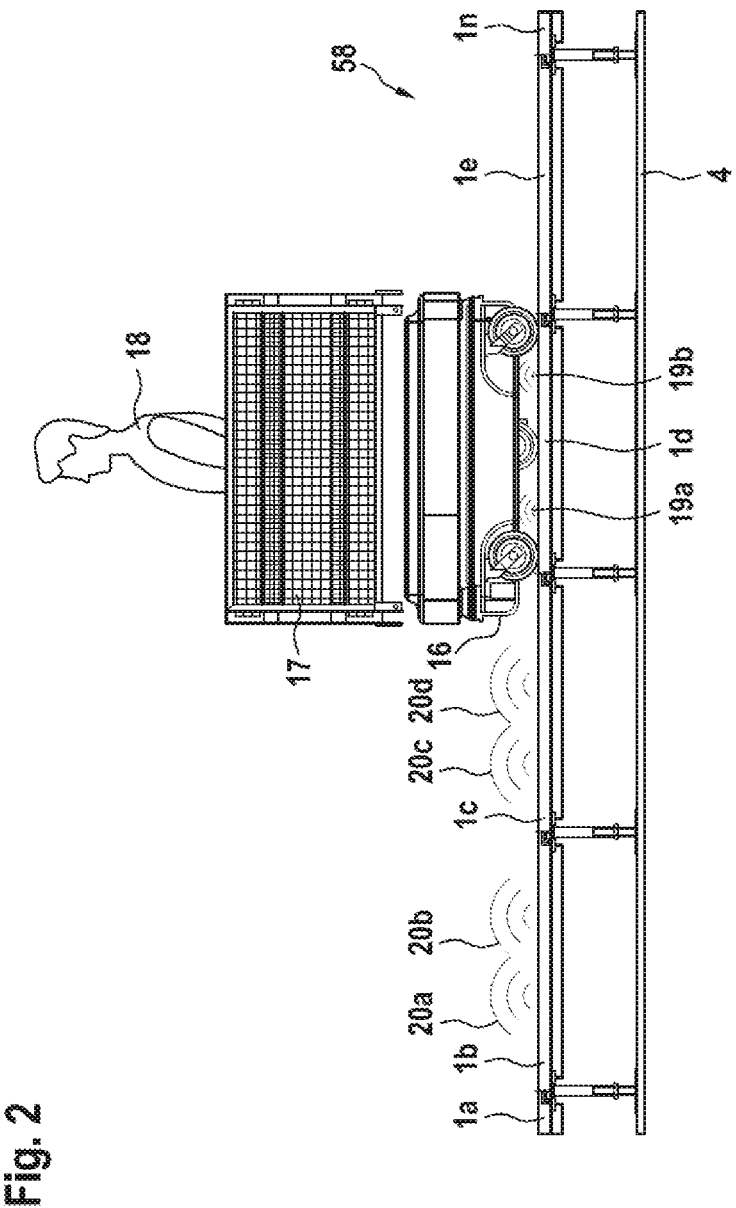
FIG. 2: schematically shows a side view of a raised floor consisting of a plurality of raised floor elements with an integrated energy supply device and an integrated visualization system, wherein a track-bound industrial truck and a person are on the raised floor.

A raised floor 58 consists of a plurality of raised floor elements 1a to 1n which are arranged beside one another in the horizontal direction (see FIG. 2). The floor panel 2 illustrated in full is connected to the floor panels 2a and 2b illustrated in truncated form via the optional connecting elements 14 and 15. For this purpose, at least one active coupling element 14a and at least one passive coupling element 15a are respectively present on or in each floor panel 2, 2a, 2b. In the example, in order to implement a connection between the floor panels 2 and 2a, an elastically movable hook element, for example, which engages in a form-fitting manner (for example snap or click connection) in a first passive coupling element 15a, for example a recess in the floor panel 2a, is fitted to the floor panel 2 as a first active coupling element 14a. In order to establish a connection between the floor panels 2 and 2b, an elastically movable second coupling element 14b which engages in a form-fitting manner in a second passive coupling element 15b in the floor panel 2 is fitted to the floor panel 2b.

The system structure of a raised floor 58 with integrated additional functions is illustrated and explained in FIG. 1. It can be stated in advance that the functions of the raised floor element 1 which are described at the outset are optional and not all functions have to occur in their entirety in a raised floor element 1. In this case, a specific module construction set is possible instead and can be assembled on the basis of the respective requirements.

The spatial and functional requirements of the user can be tackled by the individual adaptability of the raised floor 58 of modular construction with integrated additional functions. In this case, the construction of such an "active" floor to form a raised floor system is important. The supply network 12 is first of all laid on the raw floor 4 in a suitable grid. In this case, the supply network 12 may consist of one or more media supplies, for example electricity, pressure and coolant supply and a data supply. The height-adjustable supports 3a, 3b for mounting the raised floor 58 are then installed on the floor 4. Finally, the raised floor elements 1 are connected to the supply network 12 via suitable plug-in devices and are inserted into the support grid.

Figure 3:
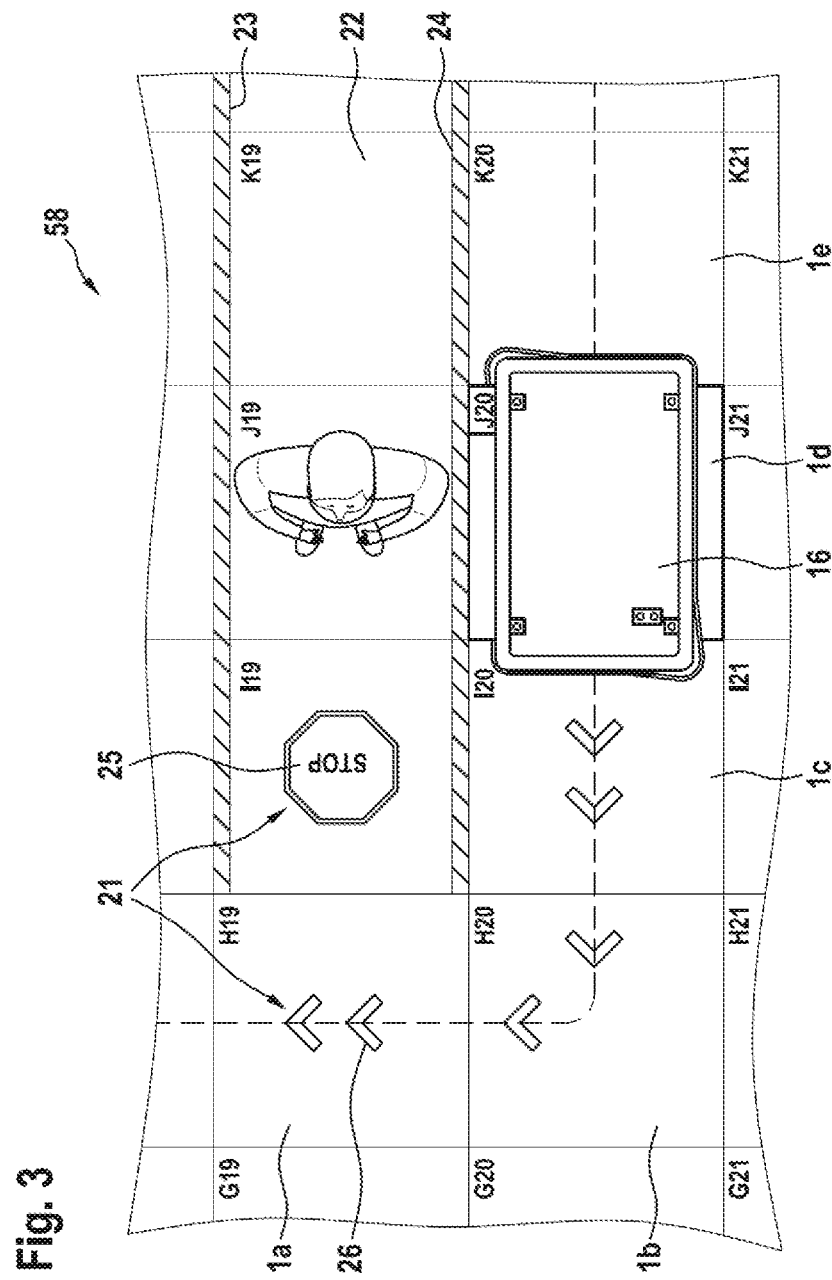
FIG. 3: schematically shows a plan view of a raised floor according to FIG. 2.

FIG. 2 shows the side view of a finished raised floor 58 on which a track-bound industrial truck 16 (driverless transport system) loaded with a pallet cage 17 is driving. A person 18 is standing on the raised floor 58 behind the driverless transport system. The first waves 19a, 19b below the driverless transport system indicate an operation of loading the driverless transport system which is currently taking place. In this case, not only the unidirectional and contactless energy transmission from the raised floor element 1 to the driverless transport system is provided, but rather it also includes the transmission from the driverless transport system to the raised floor element 1. Furthermore, a possible visualization function with second waves 20a to 20d is also shown. This function can be seen in the plan view of the raised floor 58 (FIG. 3). Here, screen surfaces are integrated in the raised floor elements and signal the lane and direction of travel of the driverless transport system. Walkways are also displayed for persons 18 in the production environment and a stop sign in order to warn of a collision with the driverless transport system.

Suitable sensors (not illustrated), for example capacitive sensors, which are integrated in the raised floor element 1 can be used to detect the presence of a person or an object on the floor element in a reliable manner and safely according to performance level d (PL d) or higher. If the raised floor elements are equipped with object detection sensors, a superordinate controller (see FIG. 6) for coordinating all processes on the raised floor can reduce the risk of an accident between a person and a production device. This is carried out by detecting when a person and a production device approach one another. The movements in the production device which are dangerous for the person can be decelerated or stopped via the controller.

Depending on the integrated functions, the result is therefore a floor area which allows the operator to flexibly convert his production devices in a manner following the market requirements. The outlay for reorganizing production is significantly minimized.

Furthermore, not only the energy supply device 10 can be integrated in the raised floor element 1. For example, the visualization systems 21 shown in FIG. 3 can also be implemented.

In a similar manner to the type of raised floor element connection illustrated in FIG. 1, the raised floor elements in FIG. 1 with the "visualization system" 21 function are also connected to the electrical energy and data supply via the control and communication unit. As a result, a wide variety of graphics or text can be displayed on the raised floor element 1, as illustrated in FIG. 3.

In a constantly changing production environment, a person has difficulties in orienting himself. The integrated visualization system 21 solves this problem by displaying a safe walkway 22 for the pedestrian. This walkway takes into account the dangerous movements of production devices and automatically circumvents them.

Furthermore, crossing of the walkway boundaries 23 and 24 is detected by the raised floor element's own sensor system and/or by the adjoining sensor system of the raised floor elements 1 and a warning is displayed, for example in the form of a stop sign 25.

The raised floor element display from FIG. 3 is used, for example, for the simple and nevertheless effective lane guidance of driverless transport systems. In this example, the raised floor elements 1a to 1e shown are configured with an LED lane and direction indicator 26, with the result that it is possible for a driverless transport system to arrive at the correct destination by following the lines.

Figure 4:
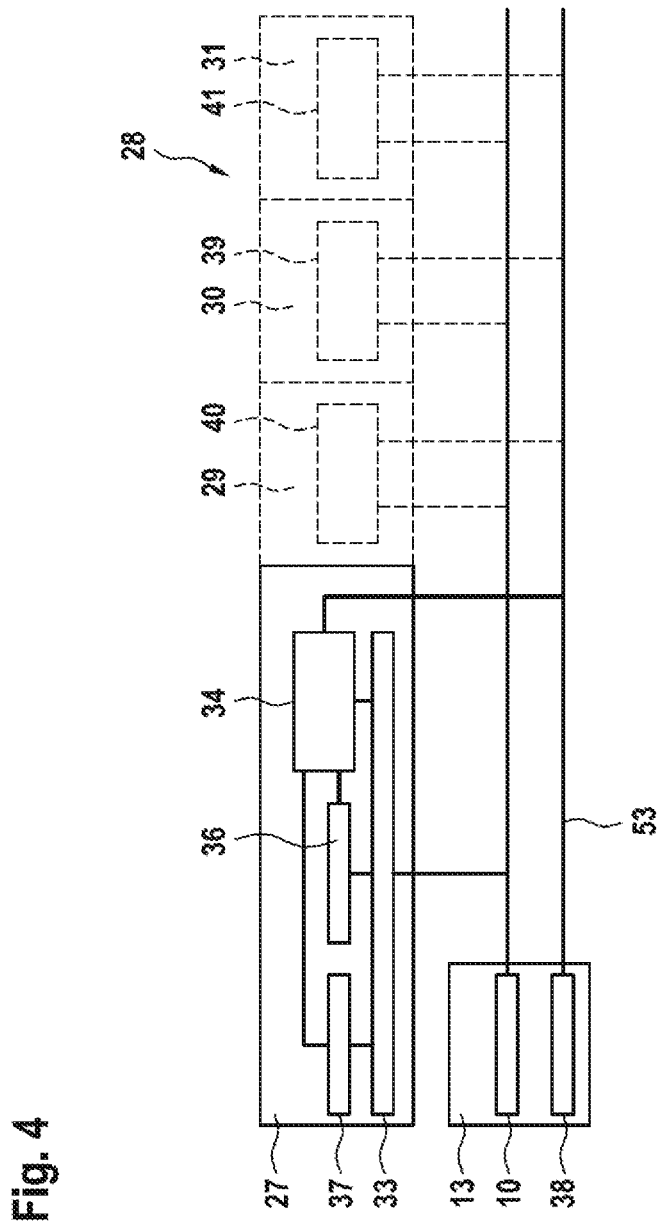
FIG. 4: schematically shows a block diagram for controlling a raised floor element, comprising, in an integrated manner, a control device and three functional elements for additional functions.
Figure 5:
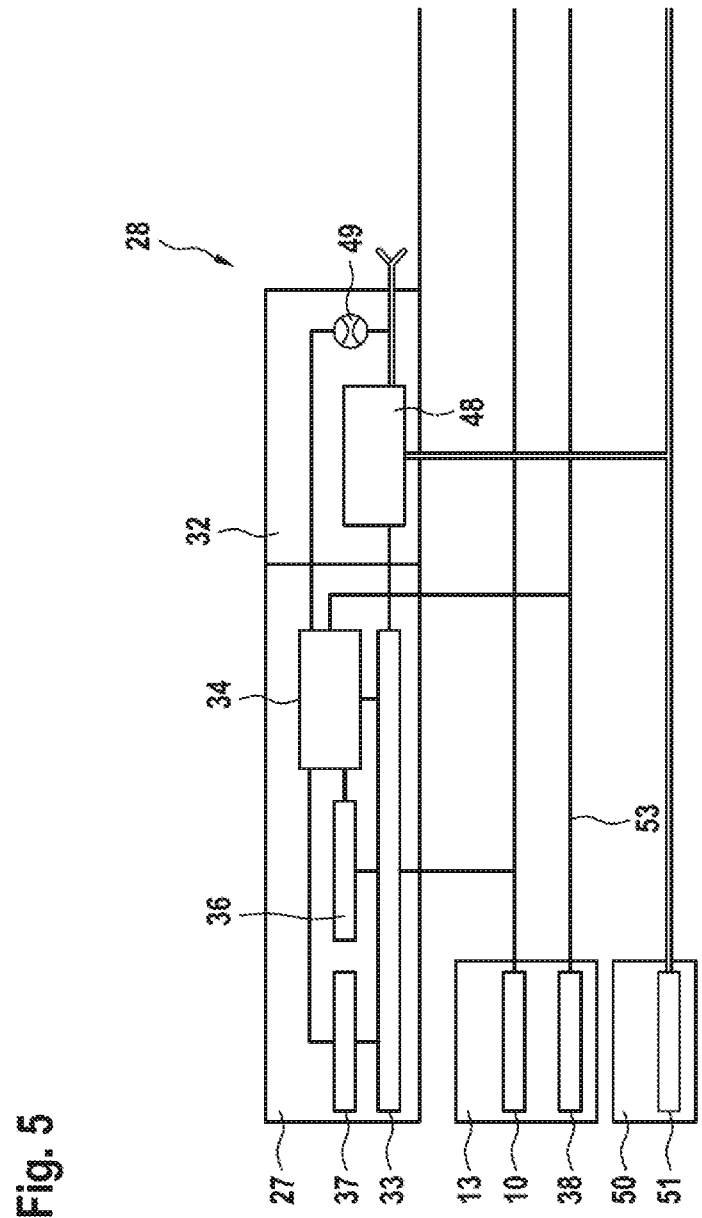
FIG. 5: schematically shows a block diagram for controlling a raised floor element, comprising, in an integrated manner, a control device and functional elements of a quadruple compressed air connection.

FIGS. 4 and 5 each show a block diagram for controlling a raised floor element 1. The two embodiments illustrated comprise at least one basic raised floor element 27 and an additional functional element 28. Whereas the basic raised floor element 27 has the same structure in both embodiments, the additional functional element 28 is provided for a first additional function 29, a second additional function 30 and a third additional function 31 according to FIG. 4, whereas the additional functional element 28 is used for a fourth additional function 32 according to FIG. 5.

The functional elements of the basic raised floor element 27 are illustrated and explained in the block diagram according to FIG. 4. In this case, the basic raised floor element 27 represents the basic configuration, on which further additional functionalities 29, 30, 31 can be constructed.

The basic raised floor element 27 comprises, in addition to a power supply device 33 for providing one or more suitable low voltages, a control device 34, a status display 36 and a balance 37 for receiving the element load. The controller is connected to the internal power supply and to the data supply network. For example, this data supply network may be an Ethernet-based, industrial EtherCAT, Profinet or SERCOS in which the controller is a field bus user. In addition to its unique identification number (ID), the controller also provides further status messages relating to the basic raised floor element 27 together with the status messages relating to the integrated additional functions 29, 30, 31.

The status display 36 of the raised floor element 1 can be implemented in different ways. For example, simple forms of visualization such as the status display via LEDs according to the traffic light colors (green=everything okay, element operating, yellow=everything okay, element not operating, red=fault, element not operating) to more complex displays via a screen are conceivable.

The balance 37 functional element reports the current load of the floor element back to a superordinate controller (superordinate control device 52 in FIG. 6) via the data supply network using the controller. In this case too, various types of sensor data acquisition and feedback are conceivable.

For example, the acquisition can be carried out using a strain gage group and can be safely reported back to the superordinate controller in two channels with a performance level d (PL d). It is therefore possible to safely detect objects on the raised floor element 1. However, simpler solutions which do not enable safe object detection are also conceivable.

Control and Communication Unit/Control Device:

The control and communication unit or the control device 34 is the central module of the raised floor element 1. It can be used to operate the raised floor element 1 both autonomously in an environment of simple raised floor elements 1 and in combination with further "intelligent" raised floor elements 1a to 1n after being connected to the supply network 12. In addition to the control and communication tasks described above, the control device in this described configuration undertakes the task of object detection on the basis of the data from the balance 37 function.

The busbar 13 preferably comprises the energy supply device 10 and a data transmission unit 38.

Bidirectionally Operating Energy Supply Device:

It is possible to load and unload different production devices by means of the bidirectionally operating energy supply device 10 which can be added as an additional function to the basic raised floor element 27. In this case, the production device can both be placed in a quiescent state on the raised floor element 1, for example an assembly cell, and can be moving, as is the case for industrial trucks 16 in intra-logistics.

In the case of moving production devices, the information relating to the time at which a loading or unloading operation is reasonably possible is made available to the energy supply device 10 via the object detection (see control and communication unit). Transmission paths which can be switched in a segmented manner can therefore be set up by means of a plurality of raised floor elements 1a to 1n which are connected in series and have the additional function "contactless energy transmission".

In order to activate the energy transmission only when suitable loadable/unloadable objects are on the raised floor element 1, the energy supply device 10 has a foreign body detection means (not illustrated). In this case, this detection safely distinguishes (PL d or higher) between production devices and living beings and between loadable/unloadable production devices and other production devices.

Bidirectionally Operating Data Transmission Unit:

The bidirectionally operating data transmission unit 38 is generally part of the energy supply device 10 and allows the (mobile) loadable/unloadable production devices to be connected to the permanently installed data supply network. Information can therefore be interchanged in both directions (transmission/reception) between the production devices and users of the data supply network.

In principle, the data transmission unit 38 is also present as an autonomous unit. If the raised floor element 1 is configured appropriately, production devices which are not loadable/unloadable can likewise set up communication with the users of the data supply network.

Visualization System:

The visualization system 21 which can be integrated as an additional functionality in the raised floor element 1 can be operated autonomously and should therefore be connected separately to the energy and data supply network. However, it may also sometimes be useful to concomitantly use the control device 34 and the power supply device 33 in the basic raised floor element 27, thus dispensing with a separate connection.

The visualization system 21 therefore consists of a screen 39 and a computer which controls the latter and has corresponding energy and data interfaces for connection to the supply network. Visualization information can therefore be transmitted to the unit by other users connected to the data supply network or by a superordinate controller. One example of possible interaction of the systems is illustrated in FIG. 3. In this case, the information "person on J 19" and "driverless transport system on J 20" is processed in a superordinate controller to form the signaling command "display stop sign on I 19". For the designation "person on J 19", area division of the raised floor 58 into grid squares is presupposed. In this case, the sections on the abscissa are consecutively indicated using letters and the sections on the ordinate are consecutively indicated with numbers in this two-dimensional Cartesian coordinate system.

FIG. 4 also shows examples of the integration of further functions in the raised floor element 1. The first additional function 29 is implemented by means of contactless energy transmission 40, the second additional function 30 is implemented by means of the screen 39 and the third additional function 31 is implemented by means of a lifting unit 41.

Sensor and Actuator System:

The various possibilities for implementing sensor and actuator components in a raised floor element 1 do not allow a detailed description of each individual use. Therefore, the general incorporation in the raised floor element 1, including its connection to the permanently installed supply network 12, is described at this point. Momentary-contact switches 43 and acceleration sensors 44—not illustrated—come into consideration as the sensor 42, for example. A switch 46 and an outlet system 47 can be used as the actuator 45.

Outlet System for Non-Electrical Media:

In a similar manner to the sensor and actuator components which can be implemented in the raised floor element 1, the range and variety of outlet systems 47 for non-electrical media, such as compressed air or coolant, are also very great. Therefore, only some outlet systems 47 which are important for the industrial environment and their integration in the raised floor element 1 are described, by way of example, at this point. AC 230/400 V sockets and two compressed air connections and AC 230/400 V sockets and two water connections can be used as outlet systems 47 for electrical and non-electrical media for installation in raised floors 58.

Such outlet systems 47 can be advantageously used in combination with energy meters for the individual media for installation in a raised floor element 1. It is therefore expedient to integrate industrially conventional connection systems 47, together with energy metering, in a raised floor 1. The industrially conventional connection systems include, inter alia:

compressed air connections up to 15 bar/28 mm including the connections for industrial gases, possibly with sensors for monitoring leaks, water connections up to 12 bar/DN 50 including the connections for refrigeration and heating technology, hydraulic connections up to 280 bar/DN 20.

These connections can now be integrated either individually or in combination in a raised floor element 1 provided that the available installation space permits this. FIG. 5 shows the integration of a quadruple compressed air connection 48 (6 bar/10 mm) in a raised-floor element 1 and its connection to the electrical and pneumatic energy supply network and to the data supply network.

All four connection points have a flow measurement (volume flowmeter 49) coupled to the control device 34 using data technology. The raised floor element 1 can therefore continuously provide the superordinate controller with current air consumption values. This information can be analyzed and can possibly help to improve the energy efficiency of the connected production means. 50 is used to denote a pipeline and 51 is used to denote a compressed air source.

FIG. 6 shows a block diagram for controlling two raised floor elements 1a and 1b, wherein a superordinate control device 52 is connected to the control devices 34 and 35 of the raised floor elements 1a and 1b. A first functional element 54 and a second functional element 55 are connected to the first control device 34 and a third functional element 56 and a fourth functional element 57 are connected to the second control device 35.

A raised floor 58 comprising a plurality of raised floor elements 1; 1a to 1n can be constructed in two ways. On the one hand, all raised floor elements 1; 1a to 1n can be structurally identical. On the other hand, the raised floor elements 1; 1a to 1n can be at least partially structurally different. In both cases, different functions can be implemented by virtue of the superordinate control device 52 controlling different functional elements 54, 55, 56, 57 via the control devices 34 and 35. 53 is used to denote a data-carrying connection.

LIST OF REFERENCE SIGNS

1 Raised floor element
1a to 1n Raised floor elements
2 Floor panel
2a to 2n Floor panels
3 Frame element
3a, 3b Supports
4 Raw floor
5 Free space
6a, 6b Head plate
7a, 7b Base plate
8a, 8b Threaded shaft
9a, 9b Threaded tube
10 Energy supply device
11 Connection line
12 Electrical supply network
13 Busbar
14 First connecting element
14a First active coupling element
14b Second active coupling element
15 Second connecting element
15a First passive coupling element
15b Second passive coupling element
16 Track-bound industrial truck
17 Pallet cage
18 Person
19a, 19b First waves
20a to 20d Second waves
21 Visualization system
22 Walkway
23 First walkway boundary
24 Second walkway boundary
25 Stop sign
26 Lane and direction indicator
27 Basic raised floor element
28 Additional functional element
29 First additional function
30 Second additional function
31 Third additional function
32 Fourth additional function
33 Power supply device
34 First control device
35 Second control device
36 Status display
37 Balance
38 Data transmission unit
39 Screen
40 Contactless energy transmission device
41 Lifting unit
42 Sensor
43 Momentary-contact switch
44 Acceleration sensor
45 Actuator
46 Switch
47 Outlet system
48 Compressed air connection
49 Volume flowmeter
50 Pipeline
51 Compressed air source
52 Superordinate control device
53 Data-carrying connection
54 First functional element
55 Second functional element
56 Third functional element
57 Fourth functional element
58 Raised floor

What is claimed is:

1. A system, comprising:
    a plurality of raised floor elements configured for a raised floor, the raised floor elements each including:
        an upper floor panel, a limited free space adjoining the upper floor panel to a bottom, and
        at least two functional elements, at least one of the functional elements configured to be actuated by a control device; and
    a superordinate monitoring unit connected in a data-carrying manner to the control devices of the raised floor elements, wherein the limited free space is limited in a variably adjustable manner with at least one frame element, wherein:
    the control device is one of a plurality of control devices, each of the plurality of raised floor elements including a respective one of the plurality of control devices;

a first of the at least two functional elements of a first of the plurality of raised floor elements includes a sensor; and a second of the at least two functional elements of the first of the plurality of raised floor elements includes a contactless energy supply device.

2. A raised floor element for a raised floor, comprising:
an upper floor panel, a limited free space adjoining the upper floor panel to a bottom;
a control device;
at least two functional elements, at least one of the functional elements configured to be actuated by the control device;
a first hook having a downwardly extending hook portion extending from a horizontally extending hook portion on a first side of the upper floor panel; and
a first recess including a downwardly extending recess portion extending downwardly from a horizontally extending recess portion on a second side of the upper floor panel, the second side opposite to the first side, wherein
a first of the at least two functional elements includes a sensor, and
a second of the at least two functional elements includes a contactless energy supply device.

3. The raised floor element according to claim 2, wherein at least one of the at least two functional elements is selected from the following group:
a bidirectionally operating energy supply device,
a bidirectionally operating data transmission unit, and
a visualization system comprising visualization actuators.

4. The raised floor element according to claim 2, wherein at least one of the at least two functional elements is selected from the following group:
a sensor,
a capacitively operating momentary-contact switch,
an acceleration sensor,
an actuator,
a switch configured to guide track-bound industrial trucks, and
a lifting unit.

5. The raised floor element according to claim 2, further comprising an outlet system configured for non-electrical media.

6. The raised floor element according to claim 2, wherein at least one of the at least two functional elements is arranged in or on the floor panel.

7. The raised floor element according to claim 2, wherein at least one of the at least two functional elements is an integral part of the floor panel.

8. The raised floor element according to claim 2, wherein the limited free space is limited in a variably adjustable manner with at least one frame element.

9. The raised floor element according to claim 2, wherein the first hook and the first recess are fitted to the floor panel.

10. The raised floor element according to claim 2, wherein the first hook is one of a plurality of hooks, and the first recess is one of a plurality of recesses.

11. The raised floor element according to claim 2, further comprising at least one receptacle configured for an additional functional element.

12. The system according to claim 1, wherein:
a third of the at least two functional elements of the first of the plurality of raised floor elements includes an LED signaling device.

13. The raised floor element according to claim 2, wherein at least one of the at least two functional elements is configured to be switched on and off by the control device.

14. The raised floor element according to claim 2,
wherein
a third of the at least two functional elements includes an LED signaling device.

15. A raised floor element for a raised floor, comprising:
an upper floor panel, a limited free space adjoining the upper floor panel to a bottom;
a first functional elements including a sensor;
a second functional element including a contactless energy supply device; and
a control device operatively connected to the first and second functional elements and configured to detect an object using the sensor, identify the detected object, and activate the contactless energy supply device in response to the identification.

* * * * *